June 23, 1953 — W. W. HANSEN — 2,643,296
HIGH-FREQUENCY ENERGY DIVIDING APPARATUS
Filed Sept. 28, 1949
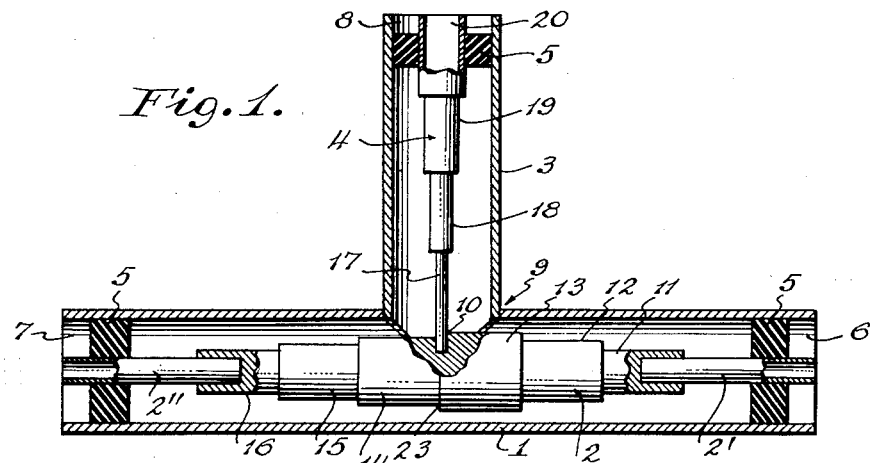
*Fig.1.*
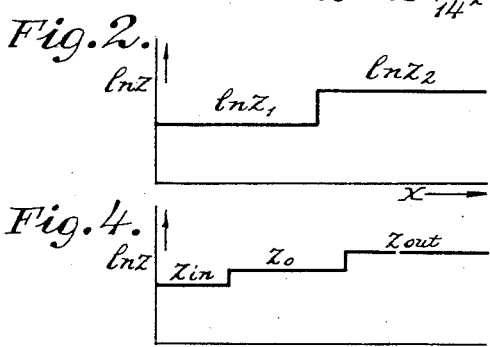
*Fig.2.* *Fig.3.*
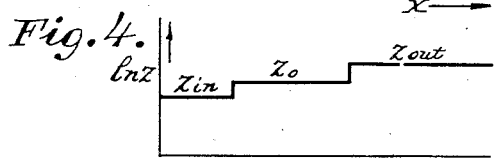
*Fig.4.* *Fig.5.*
*Fig.6.* *Fig.7.*
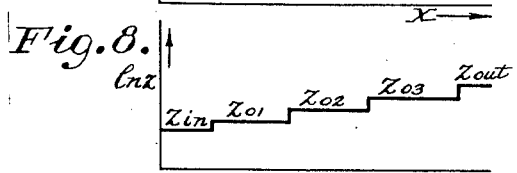
*Fig.8.* *Fig.9.*
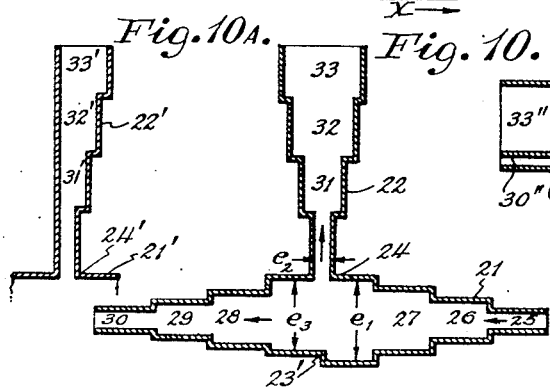
*Fig.10A.* *Fig.10.* *Fig.11.*
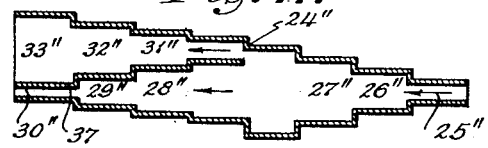
INVENTOR
WILLIAM W. HANSEN, DECEASED
BY BETSY R. HANSEN, EXECUTRIX
BY Paul B. Hunter
ATTORNEY

UNITED STATES PATENT OFFICE 2,643,296

HIGH-FREQUENCY ENERGY DIVIDING APPARATUS

William W. Hansen, deceased, late of Stanford University, Calif., by Betsy R. Hansen, executrix, Stanford University, Calif.; Olive D. Ross, executrix of said William W. Hansen, deceased, assignor to The Sperry Corporation, a corporation of Delaware Application September 28, 1949, Serial No. 118,298

11 Claims. (Cl. 178—44)

The present invention relates to improved microwave frequency power divider apparatus incorporating frequency insensitive, broad band matching sections.

The present application is a continuation-in-part of Serial No. 429,508, filed February 4, 1942, entitled "A High Frequency Power Measuring Device," now abandoned.

The principal object of the invention is to provide apparatus for measuring microwave frequency power.

Another object is to provide novel microwave frequency transmission line apparatus effecting wave energy division, whereby a predetermined amount of wave energy flowing through a transmission line may be diverted for measurement or for other purposes.

Another object is to provide novel frequency insensitive apparatus having broad band matching characteristics effecting wave energy division in electromagnetic wave energy transmission lines either of wave guide or coaxial line structure, whereby a calculable portion of the wave energy flowing through a transmission line may be diverted for measurement or for other purposes.

Another object is to provide transformer matching sections in transmission lines either of wave guide or coaxial line structure effecting frequency insensitive, broad band matching characteristics.

Another object is to provide microwave frequency transmission lines either of wave guide or coaxial line structure having frequency insensitive, broad band matching characteristics in which the logarithmic increments of the impedances to be matched along a transmission line are proportional to binomial coefficients resulting from a binomial expansion.

Other objects, features and advantages will become apparent from the specification, taken in connection with the accompanying drawings wherein the invention is embodied in concrete form.

In the drawings,

Fig. 1 is a longitudinal, cross-sectional view of a coaxial line power divider;

Figs. 2 through 9 are explanatory curves used in explaining the operation of the device of Fig. 1;

Fig. 10 is a longitudinal cross-sectional view of a wave guide power divider;

Fig. 10A illustrates a modification of the embodiment of Fig. 10.

Fig. 11 is a modified version of the device shown in Fig. 10.

Fig. 1 illustrates a current or energy dividing device matched over a considerable range of microwave frequency. Inner conductors 2 and 4 are maintained in a relatively coaxial relation within outer conductors 1 and 3, respectively, by dielectric supporters 5. Coaxial line 1, 2 has terminal ends 6 and 7, and coaxial line 3, 4 has an outer terminal end 8. The coaxial lines 1, 2 and 3, 4 are coupled at a junction 9 where inner conductor 4 extends to contact inner conductor 2 at a joint 10.

There are diametral discontinuities at quarter wave intervals along the coaxial lines 1, 2 and 3, 4. In Fig. 1, the diametral discontinuities define quarter wavelength sections 11, 12, 15, 16, 18 and 19 of the inner conductors having different diameters. Each of these sections is one-quarter wavelength long at a predetermined frequency of operation.

It is well known in the art that a discontinuity in a microwave frequency transmission line causes undesirable reflections of wave energy. This may be expressed in terms of a reflection coefficient for the transmission line. In general, the reflection coefficient is complex, and it comprises the phase and the magnitude of the reflected wave relative to the incident wave propagated along the transmission line in terms of voltage or current.

The reflection coefficient resulting from a sharp discontinuity in the transmission line is substantially independent of frequency. Fig. 3 illustrates the resulting reflection coefficient R as a function of frequency $f$ for a transmission line having an impedance discontinuity at some point therealong. The impedance discontinuity is formed by two unequal impedances $Z_1$ and $Z_2$. The resulting reflection coefficient, designated as R in Fig. 3, is shown to be substantially independent of frequency. Fig. 2 is a logarithmic curve of the impedances $Z_1$ and $Z_2$ taken along the length $x$.

It is also well known that two unequal terminal impedances $Z_{in}$ and $Z_{out}$ may be matched at substantially one predetermined frequency by a quarter wavelength matching section when the relationship $$Z_0 = \sqrt{Z_{in} Z_{out}}$$

is satisfied. Impedance $Z_0$ is the characteristic impedance of the quarter wavelength matching section. Fig. 4 is a logarithmic curve of the impedances $Z_{in}$, $Z_0$ and $Z_{out}$ taken along the length $x$. Fig. 5 is a curve of the resulting reflection coefficient R compared to various values of frequency $f$. The reflection coefficient R for this arrangement is a function of frequency; reflection coefficient R has a zero value at one predetermined frequency of operation.

The frequency sensitivity of the immediately preceding matching device makes it entirely unsatisfactory for relatively broad frequency band operation. The following described device overcomes this limitation. It provides a reflectionless impedance match for a relatively broad microwave frequency range.

The problem is to match an input terminal impedance $Z_{in}$ with an output terminal impedance $Z_{out}$. A transformer matching device having a plurality of one-quarter wavelength sections is designed to have predetermined characteristic impedances. The increments of the logarithm of $Z_{in}$, the characteristic impedances of the one-quarter wavelength sections and $Z_{out}$ are chosen to be proportional to binomial coefficients of a binomial expansion of an order equal to the number of one-quarter wavelength sections in the matching device. Such coefficients are obtained as the coefficients of the terms of the expansion of $(X-1)^n$, $n$ being the order. As the number of one-quarter wavelength sections is increased, the matching device becomes progressively less frequency sensitive.

Figures 6 and 7 show curves for a transformer matching device having two one-quarter wavelength sections. $Z_{01}$ and $Z_{02}$ designate the characteristic impedances of the one-quarter wavelength sections of the matching device that match terminal impedances $Z_{in}$ and $Z_{out}$. The reflection coefficient curve is illustrated by Fig. 7, and it shows that this device provides reflectionless matching for a progressively broad frequency band relative to the device characterized by Figs. 3 and 4. The matched impedances along the matching device are related in the following analytical manner:

$$\left.\begin{array}{l} ln Z_{01} - ln Z_{in} = K \\ ln Z_{02} - ln Z_{01} = 2K \\ ln Z_{out} - ln Z_{02} = K \end{array}\right\}$$

where K is a constant.

Figs. 8 and 9 relate to a transformer matching device built in accordance with the above-mentioned principle having three sections, each one-quarter wavelength long for matching terminal impedances $Z_{in}$ and $Z_{out}$. In this instance the matched impedances are related in the following analytical manner:

$$\left.\begin{array}{l} ln Z_{01} - ln Z_{in} = K \\ ln Z_{02} - ln Z_{01} = 3K \\ ln Z_{03} - ln Z_{02} = 3K \\ ln Z_{out} - ln Z_{03} = K \end{array}\right\}$$

where K is a constant.

The reflection coefficient curve, Fig. 9 illustrates that as the plurality of one-quarter wavelength sections is increased the matching device becomes progressively less sensitive to frequency.

It will be understood that the matching devices of the foregoing nature become less frequency sensitive as the number of quarter wavelength sections is increased. As the number of sections increase, the discontinuities in the logarithms of the matched impedances become related to successive sets of binomial coefficients; such as,

```
            1   2   1
        1   3   3   1
    1   4   6   4   1
1   5  10  10   5   1, etc.
```

For a coaxial line matching device, the desired characteristic impedances of the quarter wavelength sections may be obtained by a number of methods. For example, in Fig. 1, the inner conductors 2 and 4 of the coaxial lines 1, 2 and 3, 4 are designed to have quarter wavelength sections of different diameters while the outer conductors 1 and 3 remain uniformly constant. An alternative method involves quarter wavelength section of outer conductor of different diameters while the inner conductor thereof remains substantially constant. A further method would be to vary the dielectric constant of the dielectric medium along the transmission line. A still further method involves the combination of the aforesaid techniques.

The current divider of Fig. 1 incorporates matching sections designed in accordance with the above-mentioned principles to provide matched broad band operation. In Fig. 1, it will be assumed that wave energy flow is from right to left; that is from terminal end 6 toward terminal end 7. The tapped wave energy flows along a tap line, coaxial line 3, 4, from junction 9 toward terminal end 8.

The impedances of coaxial lines 1, 2 and 3, 4 are matched at junction 9 by the quarter wavelength sections 11, 12, 15, 16, 18 and 19. The quarter wavelength sections 11, 12 match the terminal end 6 with the junction 9. The logarithmic impedance increment between the sections of line having inner conductor sections 2' and 11 may be designated $K_1$. The logarithmic impedance increment between the sections of line having inner conductor sections 11 and 12 is $2K_1$, and the logarithmic impedance increment between the sections of line having inner conductor sections 12 and 13 is $K_1$.

A diameter discontinuity or step 23 between sections 13 and 14 of inner conductor 2 effects a sharp impedance change at the joint 10. The impedance of inner conductor 2 at the left of the joint 10 is accordingly higher than its impedance at the right of the joint 10. The impedance of line 3, 4 looking toward terminal end 8 from junction 9 is very high relative to the impedance of line 1, 2 at junction 9. The impedance discontinuity afforded by step 23 cooperates with the impedances of both lines at the junction 9 to afford a uniform impedane transition thereat. This will be understood if the relatively high input impedance of line 3—4 is considered to be in parallel with the impedance of line 1, 2 immediately to the left of joint 10. The step 23 is designed so that the equivalent impedance of these two parallel impedances is designed to be substantially equal to the impedance of line 1, 2 immediately to the right of joint 10.

The terminal end 7 is matched to junction 9 by quarter wavelength sections 15, 16. The logarithmic impedance increment of sections of line having inner conductor sections 2'', 16 may be designated $K_2$. The increment for the sections of line having inner conductor sections 16, 15 is $2K_2$, and that for sections of line having inner conductor sections 15, 14 is $K_2$.

In the tap line 3, 4, the terminal end 8 is matched to the junction 9 by the quarter wavelength sections 18, 19. The logarithmic impedance increment between sections of line having inner conductor sections 17, 18 may be designated $K_3$. The increment between sections of line having inner conductor sections 18, 19 is $2K_3$, and that between sections of line having inner conductor sections 19, 20 is $K_3$.

The impedances at terminal ends 6 and 7 may be equal or unequal. The output impedance of tap line 3, 4 may be chosen to match a measuring device (not shown) which would be coupled thereat. The portion of energy flowing toward terminal end 7 may be absorbed by an absorbing device (not shown) attached at that terminal.

The constants $K_1$, $K_2$, $K_3$, are dependent variables. For arbitrary values of $K_1$, diameters of line having sections 2' and 2'' and the power ratio division at the junction 9, the constants $K_2$, $K_3$ become determinable.

A wave guide version power divider is shown in Fig. 10. A tap line 22 is coupled to a main line 21 at a junction 24. The broad band matching technique applied to the coaxial line version of Fig. 1 is also applicable here. The cross-sectional dimensions of the wave guide may be varied at quarter wavelength intervals to obtain the proper characteristic impedance discontinuities. It is preferable to change the cross-sectional dimension parallel to the electric vector to maintain the phase velocity constant.

The quarter wavelength sections 26, 27 match the junction 24 to the terminal end 25. The quarter wavelength sections 28, 29 match the junction 24 to the terminal end 30, and terminal end 33 is matched by quarter wavelength sections 31, 32.

A step 23' in the wall of wave guide 21 provides a uniform impedance transition at junction 24. The amount of step is chosen so that the impedance of the main line 21 looking toward terminal end 30 from the junction 24 plus the impedance of the tap line 22 looking toward the terminal end 33 from the junction 24 equals the impedance of main line 21 looking toward terminal end 25 from the junction 24.

The wave guide power divider of Fig. 10 is a voltage divider; and at the junction 24 the voltages satisfy the relationship $e_1=e_2+e_3$. Wave energy flow in the device of Fig. 10 is indicated by the arrows.

It will be understood that it is not necessary to have steps in both opposite walls of the wave guide to obtain the desired characteristic impedance discontinuities. In the embodiment of Fig. 10A, only one wall of wave guide 22' includes steps for the purpose of obtaining the desired characteristic impedance discontinuities. The underlying principle and operation of both the wave guide power divider and matching sections of the embodiment of Fig. 10A is the same as that for the embodiment shown in Fig. 10.

Fig. 11 is a modification of the device shown in Fig. 10. In this instance, the tap line 22 of the embodiment of Fig. 10 is rotated 90 degrees to extend parallel with the main line 21. Accordingly the wave guide lines to the left of junction 24'' in Fig. 11 share a common wall 37. There is a uniform impedance transition at junction 24'' because the impedances on either side thereof are equal.

The characteristic impedance discontinuities in the foregoing illustrated devices are obtained by varying the geometry of the transmission line conductors. The dielectric medium along the transmission line conductors is assumed to be constant. Accordingly, the characteristic impedance discontinuities are independent of the dielectric medium extending along the conductors.

It will be understood however that the desired characteristic impedance discontinuities may be obtained by varying the dielectric constant of the dielectric medium extending along the conductors. In this instance, the lengths of the transformer matching sections would be electrically equivalent to one-quarter wavelength for the particular dielectric medium in the individual matching sections.

It is within the scope of the invention to have more than one tap line for each power dividing device shown herein. It will also be understood that two or more such power dividing devices may be used in cascade to obtain greater ratios of power division.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. A microwave frequency power divider comprising three electromagnetic wave energy conductors coupled at a junction, said conductors having transformer means to present different impedances at said junction, said transformer means including sections of conductor electrically equivalent to one-quarter wavelength and defining characteristic impedance discontinuities, the logarithmic increments of the impedances along said conductors being proportional respectively to the coefficients resulting from the binomial expansion of $(X-1)^n$, where $n$ is equal to the number of said sections.

2. A microwave frequency power divider including at least a plurality of hollow electrical conductors for propagating electromagnetic wave energy therein, said conductors being coupled at a junction, said conductors having transformer sections to present different impedances at said junction, said transformer sections of conductor having different hollow cross-sectional areas defining characteristic impedance discontinuities, said sections being electrically equivalent to one-quarter wavelength long at a predetermined frequency of operation, the logarithmic increments of the impedances along said conductors being proportional respectively to the coefficients resulting from the binomial expansion of $(X-1)^n$, where $n$ is the number of said sections.

3. A microwave frequency power divider comprising a plurality of electromagnetic wave energy conductors coupled at a junction, said conductors having transformer means to present different impedances at said junction, said transformer means including a plurality of conductor sections of different dimensions defining characteristic impedance discontinuities at intervals electrically equivalent to one-quarter wavelength, the logarithmic increments of the impedances along said conductors being respectively proportional to the coefficients resulting from the binomial expansion of $(X-1)^n$, where $n$ is equal to the number of quarter wavelength sections.

4. A microwave frequency power divider comprising a plurality of wave guides coupled at a junction, said wave guides having transformer sections to present different impedances at said junction including a plurality of quarter wavelength sections of different cross-sectional areas defining characteristic impedance discontinuities, the logarithmic increments of the impedances along said wave guides being proportional respectively to the coefficients resulting from a binomial expansion of $(X-1)^n$, where $n$ is equal to the number of quarter wavelength sections.

5. A microwave frequency power divider comprising a plurality of wave guides extending in a relatively parallel relation, said wave guides being coupled at a common junction, two wave guides of said plurality having a common wall, and said wave guides having transformer sections of different impedances at said junction including quarter wavelength wave guide sections having different cross-sectional areas defining characteristic impedance discontinuities, the logarithmic increments of the impedances along said wave guides being proportional respectively to the coefficients resulting from a binomial expansion of $(X-1)^n$, where $n$ is equal to the number of quarter wavelength matching sections.

6. A microwave frequency power divider comprising a pair of coaxial lines, one coaxial line being coupled to the other coaxial line at an intermediate junction along said first-mentioned line, said coaxial lines having transformer sections for presenting different impedances at said junction including quarter wavelength sections of inner conductor of different diameters defining characteristic impedance discontinuities, the logarithmic increments of the impedances along said coaxial lines being proportional respectively to the coefficients resulting from binomial expansions of $(X-1)^n$, where $n$ is equal to the number of quarter wavelength sections, the inner conductor of said first-mentioned coaxial line having a diameter discontinuity at said junction, said impedance of said first-mentioned coaxial line being relatively low at said junction and the impedance of said other coaxial line being relatively high at said junction whereby a uniform impedance transition is afforded at said junction.

7. A microwave frequency power divider comprising at least three coaxial lines, a first of said coaxial lines being coupled to the others of said coaxial lines to define a junction, the admittances of the coaxial lines at said junction being such that the admittance of one of the lines is equal to the sum of the admittances of the other lines, said coaxial lines having transformer sections to present different impedances at said junction including a plurality of quarter wavelength sections of inner conductor of different diameters defining characteristic impedance discontinuities, the logarithmic increments of the impedances along said lines being proportional respectively to the coefficients resulting from the binomial expansion of $(X-1)^n$, where $n$ is equal to the number of quarter wavelength sections.

8. A microwave frequency power divider comprising a plurality of coaxial line conductors, said coaxial lines being coupled at a junction, said lines having transformer sections including a plurality of quarter wavelength sections of conductor of different diameters defining characteristic impedance discontinuities, the logarithmic increments of the impedances along said coaxial lines being proportional respectively to the coefficients resulting from binomial expansion of $(X-1)^n$, where $n$ is equal to the number of quarter wavelength sections.

9. A microwave frequency matching transformer comprising a wave guide having predetermined terminal impedances, said wave guide having a plurality of transformer sections including a plurality of quarter wavelength sections of different cross-sectional areas defining a plurality of characteristic impedance discontinuities therealong, the logarithmic increments of the impedances along said wave guide being proportional respectively to the coefficients resulting from a binomial expansion of $(X-1)^n$, where $n$ is equal to the number of said quarter wavelength sections.

10. A coaxial line power divider for transmitting microwave energy from an input coaxial line in a preselected ratio to two output coaxial lines of different characteristic impedances, the power divider comprising three coaxial line sections having inner and outer conductors connected in a common junction, the outer conductors of the coaxial line sections being of substantially equal diameter and the inner conductors of the respective coaxial line sections being of unequal diameters, a plurality of quarter wavelength long impedance matching coaxial line sections connected in series with each of the said junction forming coaxial line sections, the input and output coaxial lines being connected to said junction-forming coaxial line sections by said impedance matching sections, the characteristic impedances of each group of impedance matching sections, connecting coaxial line, and junction-forming line section being so designed that the changes in the logarithm of impedance of successive sections have the same ratio to each other as the successive coefficients resulting from a binomial expansion of $(X-1)^n$, where $n$ is the number of impedance matching sections in series.

11. Apparatus as defined in claim 10 wherein the admittance of one of the three junction-forming coaxial line sections is equal to the sum of admittances of the remaining junction-forming coaxial line sections, the junction-forming coaxial line section having the largest admittance being in series with the input coaxial line.

BETSY R. HANSEN,
*Executrix of the last will and testament of William W. Hansen, deceased.*

References Cited in the file of this patent

UNITED STATES PATENTS

| Number | Name | Date |
| --- | --- | --- |
| Re. 22,374 | Carter | Sept. 14, 1943 |
| 2,155,652 | Gothe et al. | Apr. 25, 1939 |
| 2,204,712 | Wheeler | June 18, 1940 |
| 2,269,991 | Scheldorf | Jan. 13, 1942 |

FOREIGN PATENTS

| Number | Country | Date |
| --- | --- | --- |
| 502,807 | Germany | July 3, 1930 |